United States Patent
Huang et al.

(10) Patent No.: US 11,347,787 B2
(45) Date of Patent: May 31, 2022

(54) IMAGE RETRIEVAL METHOD AND APPARATUS, SYSTEM, SERVER, AND STORAGE MEDIUM

(71) Applicant: Tencent Technology (Shenzhen) Company Limited, Shenzhen (CN)

(72) Inventors: Guizhou Huang, Shenzhen (CN); Xiangyu Song, Shenzhen (CN); Wei He, Shenzhen (CN); Dean Guo, Shenzhen (CN); Qiquan Jiang, Shenzhen (CN)

(73) Assignee: Tencent Technology (Shenzhen) Company Limited, Guangdong (CN)

( * ) Notice: Subject to any disclaimer, the term of this patent is extended or adjusted under 35 U.S.C. 154(b) by 147 days.

(21) Appl. No.: 16/893,746

(22) Filed: Jun. 5, 2020

(65) Prior Publication Data

US 2020/0301961 A1 Sep. 24, 2020

Related U.S. Application Data

(63) Continuation of application No. PCT/CN2019/073116, filed on Jan. 25, 2019.

(30) Foreign Application Priority Data

Mar. 12, 2018 (CN) .................. 201810200560.X

(51) Int. Cl.
*G06F 16/583* (2019.01)
*G06F 16/901* (2019.01)
*G06K 9/62* (2022.01)

(52) U.S. Cl.
CPC ........ *G06F 16/583* (2019.01); *G06F 16/9014* (2019.01); *G06K 9/6215* (2013.01); *G06K 9/6232* (2013.01)

(58) Field of Classification Search
CPC ................ G06K 9/6232; G06K 9/6215; G06F 16/9014; G06F 16/583
See application file for complete search history.

(56) References Cited

U.S. PATENT DOCUMENTS

| 7,027,651 B2 * | 4/2006 | Simon .................. G06V 10/757 |
| | | 382/209 |
| 8,942,487 B1 | 1/2015 | Baluja et al. |

(Continued)

FOREIGN PATENT DOCUMENTS

| CN | 101964041 A | 2/2011 |
| CN | 102508910 A | 6/2012 |

(Continued)

OTHER PUBLICATIONS

International Search Report and Written Opinion with English Translation for International Patent Application No. PCT/CN2019/073116 dated Apr. 24, 2019; 12 pages.

(Continued)

*Primary Examiner* — Mia M Thomas
(74) *Attorney, Agent, or Firm* — Crowell & Moring LLP

(57) ABSTRACT

This application discloses an image retrieval method and apparatus, a system, a server, and a storage medium. The method includes: obtaining a first hash value of a to-be-retrieved reference image; splitting the first hash value into a preset quantity of first hash value segments, wherein a first hash value segment of the first hash value segments has a unique sequence position corresponding to a position of the first hash value segment in the first hash value; locating a target hash table according to the sequence position of the first hash value segment, wherein the target hash table is used for storing hash value segments that are at the sequence position of the first hash value segment in hash values of images; retrieving, from the hash value segments of the target hash table, a second hash value segment that is the (Continued)

same as the first hash value segment; and retrieving, from candidate images to which the second hash value segment belongs, a target image similar to the reference image. The solution of this application can reduce a data processing amount in an image retrieval process and improve image retrieval efficiency.

18 Claims, 8 Drawing Sheets

(56) References Cited

U.S. PATENT DOCUMENTS

| | | | |
|---|---|---|---|
| 9,104,687 B2* | 8/2015 | Euresti | G06F 16/174 |
| 10,203,905 B2* | 2/2019 | Neporada | G06F 11/1458 |
| 10,289,937 B2* | 5/2019 | Prasad | G06F 16/5866 |
| 10,353,768 B2* | 7/2019 | Watanabe | G06F 16/2455 |
| 10,482,129 B1* | 11/2019 | Blott | G06F 3/0604 |
| 10,592,210 B2* | 3/2020 | Junghans | G06F 9/3838 |
| 10,686,589 B2* | 6/2020 | Monahan | G06F 16/90 |
| 10,755,091 B2* | 8/2020 | Xu | G06V 10/22 |
| 11,003,715 B2* | 5/2021 | Shattah | G06F 9/5022 |
| 11,048,766 B1* | 6/2021 | Chen | G06F 16/9014 |
| 11,049,349 B2* | 6/2021 | Onischuk | G07C 13/00 |
| 2004/0107346 A1* | 6/2004 | Goodrich | H04L 9/3268 |
| | | | 713/176 |
| 2008/0104032 A1* | 5/2008 | Sarkar | G06F 16/958 |
| | | | 707/999.102 |
| 2008/0243934 A1 | 10/2008 | Fou | |
| 2010/0043057 A1* | 2/2010 | Di Battista | G06F 16/284 |
| | | | 726/2 |
| 2010/0185615 A1 | 7/2010 | Monga | |
| 2013/0262421 A1* | 10/2013 | Ferguson | H04L 9/0643 |
| | | | 707/697 |
| 2014/0181057 A1* | 6/2014 | Euresti | G06F 16/174 |
| | | | 707/698 |
| 2017/0295195 A1* | 10/2017 | Wettstein | G06F 21/57 |
| 2018/0373894 A1* | 12/2018 | Kim | H04N 5/77 |
| 2020/0081914 A1* | 3/2020 | Scott | G06F 16/7834 |
| 2021/0110201 A1* | 4/2021 | Jo | G06F 11/1453 |
| 2021/0150542 A1* | 5/2021 | Loyd | G07C 13/00 |

FOREIGN PATENT DOCUMENTS

| | | |
|---|---|---|
| CN | 103678702 A | 3/2014 |
| CN | 107729935 A | 2/2018 |

OTHER PUBLICATIONS

Extended European Search Report for European Patent Application No. 19766447.7 dated Nov. 9, 2021, 7 pages.

* cited by examiner

IMAGE RETRIEVAL METHOD AND APPARATUS, SYSTEM, SERVER, AND STORAGE MEDIUM

RELATED APPLICATION

This application is a continuation application of the International PCT Application No. PCT/CN2019/073116, filed with the Chinese Patent Office on Jan. 25, 2019 which claims priority to Chinese Patent Application No. 201810200560X, filed with the Chinese Patent Office on Mar. 12, 2018 and entitled "IMAGE RETRIEVAL METHOD AND APPARATUS, SYSTEM, SERVER, AND STORAGE MEDIUM", which are incorporated by reference in their entireties.

FIELD OF THE TECHNOLOGY

This application relates to the field of computer technologies, and in particular, to a method and apparatus, a system, a server, and a storage medium for performing image retrieval.

BACKGROUND OF THE DISCLOSURE

The image retrieval technology has been generally applied to various fields. For example, for a shopping platform, it may need to find, from a plurality of product images stored in a database according to a to-be-retrieved image provided by a user, a product image similar to the to-be-retrieved image, and further locate a product corresponding to the product image. For another example, for a copyright authentication platform for image-based copyright authentication, it needs to query, according to a to-be-retrieved image provided by a user, whether there is an image similar to the to-be-retrieved image in a database, to provide a basis for copyright authentication.

During an image retrieval process, to query whether there is an image similar to the to-be-retrieved image in the database, similarity between the to-be-retrieved image and each image in the database needs to be successively calculated. It is relatively complex and time-consuming to calculate the similarity between two images. In addition, because the quantity of images in the database is relatively large, successively calculating the similarity between each image in the database and the to-be-retrieved image leads to an excessively large data calculation amount, thus causing excessively low image retrieval efficiency.

SUMMARY

This application provides a method and apparatus, a system, a server, and a storage medium for image retrieval, to reduce the data processing amount during an image retrieval process and improve image retrieval efficiency.

To achieve the foregoing objective, according to a first aspect of the present disclosure, this application provides an image retrieval method, applied to a server, including:

obtaining a first hash value of a to-be-retrieved reference image, the first hash value being used for representing an image feature of the reference image;

splitting the first hash value into a preset quantity of first hash value segments, wherein each of the first hash value segments has a unique sequence position corresponding to the position of the first hash value segment in the first hash value;

locating a target hash table according to the sequence position of the first hash value segment, and retrieving, from hash value segments of the target hash table, a second hash value segment that is the same as the first hash value segment, wherein the target hash table is used for storing hash value segments in hash values of images which have the same sequence position of the first hash value segment; and retrieving, from candidate images to which the second hash value segment belongs, a target image similar to the reference image.

According to a second aspect of the present disclosure, this application further provides an image retrieval apparatus, including:

a hash obtaining unit, configured to obtain a first hash value of a to-be-retrieved reference image, the first hash value being used for representing an image feature of the reference image;

a hash splitting unit, configured to split the first hash value into a preset quantity of first hash value segments, wherein each of the first hash value segments has a unique sequence position corresponding to the position of the first hash value segment in the first hash value;

a hash retrieval unit, configured to locate a target hash table according to the sequence position of the first hash value segment in the first hash value, and retrieve, from hash value segments of the target hash table, a second hash value segment that is the same as the first hash value segment, wherein the target hash table is used for storing hash value segments in hash values of images which have the same sequence position of the first hash value segment; and an image matching unit, configured to retrieve, from candidate images to which the second hash value segment belongs, a target image similar to the reference image.

According to a third aspect of the present disclosure, this application further provides a server, including:

a processor and a memory;

the memory being configured to store a program;

the processor being configured to execute the program stored in the memory, to implement the image retrieval method according to the first aspect.

According to a fourth aspect of the present disclosure, this application further provides a readable storage medium, storing a computer program, and the computer program, when being loaded and executed by a processor, implementing the image retrieval method according to the first aspect.

According to a fifth aspect of the present disclosure, this application further provides an image retrieval system, including:

at least one master server and a plurality of slave servers;

wherein the master server is configured to obtain a first hash value of a to-be-retrieved reference image, the first hash value being used for representing an image feature of the reference image; split the first hash value into a preset quantity of first hash value segments, wherein each of the first hash value segments has a unique sequence position corresponding to the position of the first hash value segment in the first hash value; transmit the preset quantity of first hash value segments to the plurality of slave servers; and receive a query result returned by the slave server, the query result including at least information of a target image retrieved by the slave server that is similar to the reference; and wherein the slave server is configured to locate, according to the sequence position of the first hash value segment, a target hash table from an area section in which the slave server is responsible for retrieval, and retrieve, from hash value segments of the target hash table, a second hash value segment that is the same as the first hash value segment, wherein the area section is a partial storage area in storage space of a database, and the target hash table being used for storing hash value segments that are at the sequence position of the first hash value segment in hash values of images; retrieve, from candidate images to which the second hash value segment belongs, the target image similar to the reference image; and transmit the information of the retrieved target image to the master server.

In the image retrieval method provided in the embodiments of this application, after obtaining a first hash value of a to-be-retrieved reference image, a server first splits the first hash value into a preset quantity of first hash value segments; then correspondingly locates, according to a sequence position of each first hash value segment in the first hash value, a target hash table for each first hash value segment respectively, and retrieves, from hash value segments stored in the target hash table, a second hash value segment that is the same as the first hash value segment, wherein the target hash table is used for storing hash value segments in hash values of images in a database, and the hash value segments have the same sequence position as the first hash value segment; and further retrieves, from candidate images to which the second hash value segment belongs, a target image similar to the reference image. Compared with a method of determining a target image by successively calculating similarity between the reference image and each image in the database in the related art, in the technical solutions provided in the embodiments of this application, the candidate images having the same hash value segment at the same sequence position as the reference image are first selected, and further the target image similar to the reference image is determined by calculating similarity between the reference image and the candidate images. In this way, only the similarity between a small quantity of candidate images and the reference image needs to be calculated, thereby greatly reducing a calculation amount in an image retrieval process and improving image retrieval efficiency.

BRIEF DESCRIPTION OF THE DRAWINGS

To describe the technical solutions in the embodiments of this application more clearly, the following briefly describes the accompanying drawings required for describing the embodiments. The accompanying drawings in the following descriptions show merely embodiments of this application, and a person of ordinary skill in the art may still derive other accompanying drawings from the provided accompanying drawings without creative efforts.

DESCRIPTION OF EMBODIMENTS

The image retrieval method in the embodiments of this application may be applied to a plurality of different scenarios, for example, applied to a scenario such as copyright authentication of a picture, or product image locating, etc.

Figure 1:
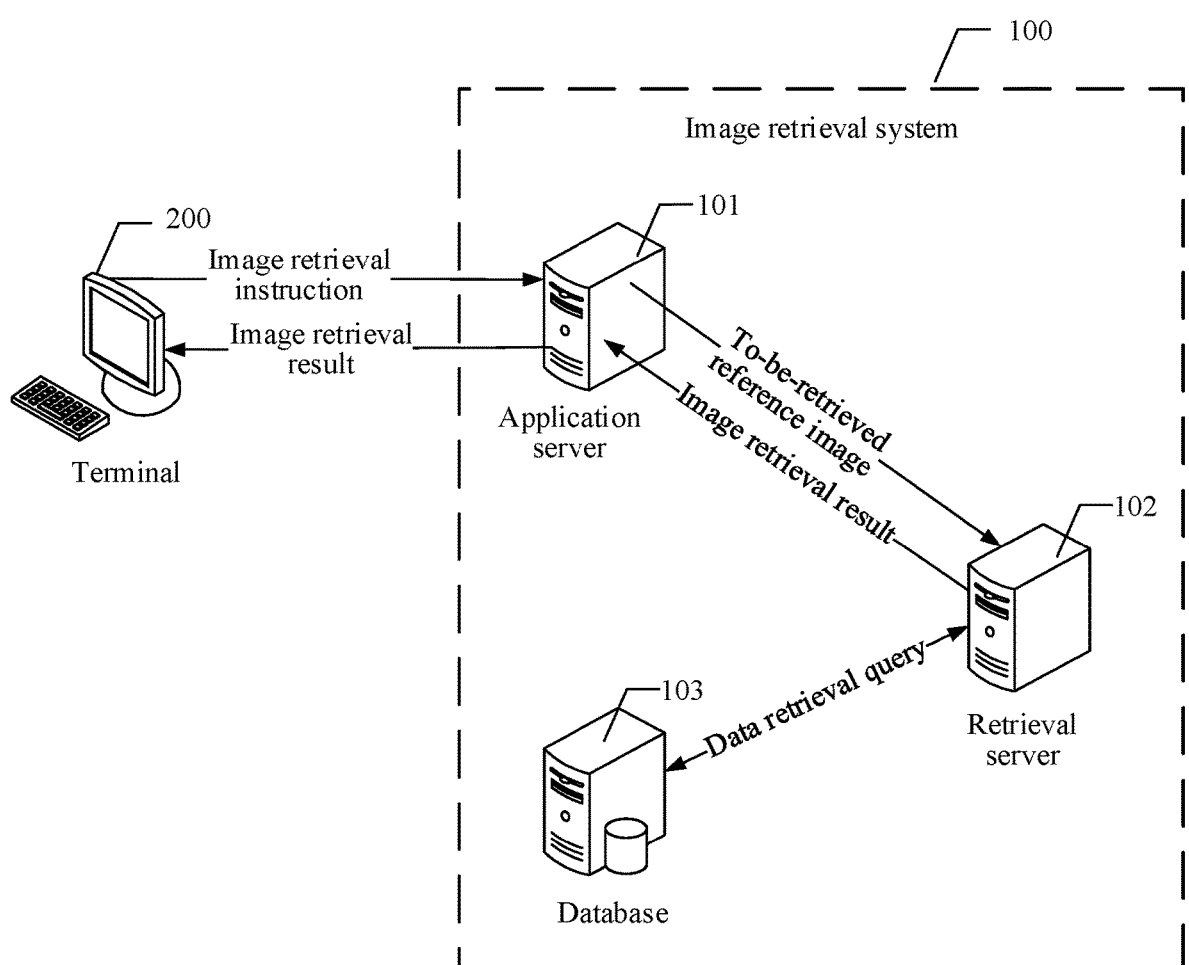
FIG. 1 is a schematic diagram of an exemplary compositional structure of an application scenario for an image retrieval method according to an embodiment of this application.

For example, FIG. 1 is a schematic diagram of an exemplary compositional structure of a scenario for an image retrieval method.

The scenario shown in FIG. 1 includes: an image retrieval system 100 and a terminal 200. The image retrieval system 100 includes: an application server 101, a retrieval server 102, and a database 103.

The terminal 200 is configured to transmit an image retrieval instruction to the application server 101 in the image retrieval system 100, the image retrieval instruction carrying a to-be-retrieved reference image (also referred to as reference image).

Correspondingly, the application server 101 is configured to transmit, in response to the image retrieval instruction, the to-be-retrieved reference image to the retrieval server 102, and transmit, in a case that the retrieval server 102 returns an image retrieval result, the image retrieval result to the terminal 200. For example, the application server 101 may be a web server.

The retrieval server 102 is configured to retrieve, according to the to-be-retrieved reference image, whether an image similar to the reference image is stored in the database 103, and return the image retrieval result to the application server 101.

The database 103 stores a plurality of images.

In the embodiments of this application, the image may be in a plurality of forms, for example, static or dynamic. In one implementation, an image may be a picture.

In FIG. 1, the application server and the retrieval server being two independent servers is used as an example for description. Alternatively, the application server and the retrieval server may be one server.

The retrieval server may analyze whether two images are similar using various methods. In the embodiments of this application, description is made by using an example in which the retrieval server analyzes similarity between two images by determining a hamming distance between hash values of the two images. Other analyzing methods may be used by the retrieval server.

The hash value of the image is also referred to as a fingerprint of the image, and is a set of hash value generated according to a feature included in the image. The hash value of the image is used for representing the feature of the image. The hash value of the image may be a binary code having a specified quantity of bits, and the specified quantity of bits may be set as required. For example, the feature of the image is extracted to generate a 64-bit hash value as the fingerprint of the image. In the embodiments of this application, hash values of images are the basis for determining whether the images are similar.

In this application, the hash value representing the image may be determined in a plurality of manners. For example, the hash value of the image may be obtained by using a perceptual hash algorithm. This is not limited in the embodiments of this application.

The hamming distance, also referred to as a code distance, means the quantity of different characters at corresponding positions of two codes. In other words, the hamming distance means the quantity of characters that need to be substituted to convert a code string into another code string.

A hash value of an image is actually a multi-bit binary code. Therefore, in the embodiments of this application, whether two images are similar may be determined according to a hamming distance between hash values (or fingerprints) of the two images. Specifically, two images may be considered to be similar when the hamming distance between the two images is less than a preset threshold. For example, the preset threshold may be 3.

For ease of description, in the embodiments of this application, a hamming distance between hash values of two images may be referred to as a hamming distance between two images for short.

It may be understood that, to determine similarity between two images based on the hamming distance, in the embodiments of this application, in addition to a plurality of images, the database further needs to store hash values corresponding to each of the plurality of images. Correspondingly, the application server or the retrieval server may calculate the hash value used for representing the feature of the to-be-retrieved reference image. The retrieval server may successively calculate, according to the hash value of the reference image and the hash values of the images in the database, the hamming distance between the reference image and each image in the database, to finally retrieve an image similar to the reference image.

However, the inventor of this application discovers that it is relatively complex and time-consuming to calculate the hamming distance between two images. In addition, when the database stores a large quantity of images, successively calculating the hamming distance between the to-be-retrieved reference image and each image in the database leads to a relatively long time of image retrieval, thus affecting image retrieval efficiency. In view of this, if the quantity of hamming distance calculations is reduced, time consumption of image retrieval may be greatly shortened, thereby improving the image retrieval efficiency.

In addition, the inventor finds out through further study that, in a case that two images are considered to be similar if a hamming distance between hash values of the two images is less than a preset threshold, when two images are similar, there are at most R (R is a preset threshold) different bits in the N-bit hash values of the two images. N represents the quantity of bits of a binary code corresponding to a hash value, and R represents the preset threshold. For example, assuming that the preset threshold R is 3, and the quantity of bits N of the hash value of the image is 64, the hash values of the two images include at most three different bits. For example, the third, the $20^{th}$, and the $63^{rd}$ bits of the two hash values may be different.

It can be learned that, if two images are similar, after the N-bit hash value of each image is split into R+1 segments in the same splitting manner to obtain R+1 hash value segments corresponding to each image respectively, in the R+1 hash value segments corresponding to the two images respectively, hash value segments in at least one same position are the same. As described above, the position may be identified by a sequence position. For example, it is assumed that R is 3, and R+1 equals 4. If an image 1 and an image 2 are similar, a hash value X of the image 1 and a hash value Y of the image 2 are different in at most three bits. If the hash value X and the hash value Y are each split into four (that is, R+1) hash value segments, the at most three different bits in the hash value X and the hash value Y may be distributed to at most three hash value segments. In another word, for example, assuming there are three different bits. These three different bits may be distributed to at most three different hash value segments. Therefore, if two images are similar, hash value segments in at least one same position are the same between the four hash value segments of the hash value X and the four hash value segments of the hash value Y. For the ease of description, in this application, unless otherwise specified, the comparison of two hash value segments indicates comparing hash value segments with a same sequence position. For example, compare the third position hash value segment in hash value X with the third position hash value segment in hash value Y. Furthermore, a hash value segment with a same sequence position is referred to as a matching hash value segment.

It may be learned through the foregoing analysis that, if R+1 hash value segments corresponding to two images respectively are all different, then the two images are not similar; and if at least one hash value segment in hash value X is the same as the matching hash value segment in hash value Y, it indicates that the two images may be similar. As described before, matching hash value segments refer to the hash value segments in the same sequence position of the hash values.

The foregoing description is made by using an example in which hash values of images are each split into R+1 segments. However, it may be understood that, in a case that a hamming distance between hash values of two images is less than a preset threshold R, if two images are similar and hash values of the two images are split into a preset quantity of hash value segments, as long as the preset quantity is greater than the preset threshold, hash value segments in at least one same position are the same in the hash value segments split from the hash values of the two images.

Therefore, in the embodiments of this application, before the hamming distance between the hash value of the to-be-retrieved reference image and the hash value of the image in the database are calculated, the N-bit hash value of the reference image is first split into a preset quantity of first hash value segments, and images in the database are queried by comparing each of the hash value segments corresponding to each of the images with the matching first hash value segment, e.g., by comparing the hash value segment of each of the images in the database in a particular sequence position with the first hash value segment in a matching sequence position. If the image in the database has at least one hash value segment that is the same as the matching first hash value segment from the reference image, then the image in the database is considered similar to the reference image. Otherwise the image in the database is considered dissimilar to the reference image and may be excluded from further consideration. Time required for comparing whether two hash value segments are the same is far less than time required for calculating the hamming distance. In addition, the quantity of images in the database having at least one same hash value segment as the reference image is far less than the total quantity of images in the database. In this way, hamming distances only need to be calculated between the images obtained after the query and the reference image, which may greatly reduce the number of times of calculating the hamming distance, thereby reducing time and computing resources consumed in an image retrieval process, and improving image retrieval efficiency.

It is found based on the foregoing research that, in the embodiments of this application, the database not only needs to store a plurality of images and an N-bit hash value of each image, but also needs to store a preset quantity (for example, R+1) of hash value segments split from the hash value of each image respectively. N represents the quantity of bits of the hash value, and may be specifically set as required. The preset quantity is a natural number greater than the preset threshold R. For ease of description, a preset quantity of R+1 is used in an example below. R+1 is the preset threshold R plus 1, the preset threshold R is set in advance, and a hamming distance between two similar images needs to be less than the preset threshold.

For ease of understanding, a process in which a hash value of an image is split into R+1 hash value segments is described first.

In the process of splitting an N-bit hash value of an image into R+1 hash value segments, values of N bits in the N-bit hash value are split into a plurality of segments according to a sequence of the bits in the N-bit hash value, and each split segment is referred to as a hash value segment. It may be understood that, each hash value segment includes at least one bit in the hash value.

Based on different requirements, the quantities of bits included in each of the R+1 hash value segments of the N-bit hash value of each image may be the same or different, as long as hash values of different images are split in the same hash value splitting manner, so that in different images, the quantities of bits included in hash value segments at the same position are the same. As described above, hash value segments at the same position have the same sequence position.

For example, a hash value has 64 bits and R+1 is 4. In this case, for the hash value of any image, the hash value may be evenly split into four hash value segments, and each hash value segment includes 16-bit data. In this way, hash value segments of different images all include 16-bit data. Alternatively, the first 8 bits of the hash value may be used as the first position hash value segment, the ninth to the $32^{nd}$ bits of the hash value are used as the second hash value segment, the $33^{rd}$ to the $40^{th}$ bits are used as the third position hash value segment, and the $41^{st}$ to the $64^{th}$ bits are used as the fourth position hash value segment. In this way, for any two images, the quantities of bits included in the first position hash value segments of the two images are the same. Similarly, the quantities of bits included in the second, the third, and the fourth position hash value segments of the two images are also the same.

In one implementation, for ease of splitting, evenly splitting the N-bit hash value into R+1 hash value segments is taken. If N can be exactly divided by R+1, the quantity of bits included in each hash value segment is the same. For example, if the hash value has 64 bits, and R+1 is 4, each hash value segment includes 16 bits. If N cannot be exactly divided by R+1, a difference between the quantities of bits included in different hash value segments is no more than one. For example, if the hash value has 64 bits, and R+1 is 5, the first four hash value segments all include 13 bits of values, and the last hash value segment includes 12 bits of values.

The foregoing describes a process of splitting the hash value of an image into hash value segments. It may be understood that, for an image to be stored in the database, after the N-bit hash value of the image is split into R+1 hash value segments, the image, the N-bit hash value of the image, and the R+1 hash value segments corresponding to the image may be stored associatively, to provide a basis for subsequent image retrieval. For example, in an implementation, when an image is stored in the database, the N-bit hash value and the R+1 hash value segments of the image are stored as related information of the image.

Considering that a relatively large quantity of images are stored in the database, if the R+1 hash value segments corresponding to the to-be-retrieved reference image are successively compared with hash value segments at corresponding positions (same sequence positions) of all images in the database, the number of comparison is relatively large and it needs to take a lot of computing time. To further reduce time required for the image retrieval, in the embodiments of this application, in addition to storing images and hash values of the images into the database, a plurality of hash tables needs to be further generated according to the quantity of hash value segments of each image. Each hash table is used for recording information of hash value segments at the same position (or sequence position) of different images.

Figure 2A:
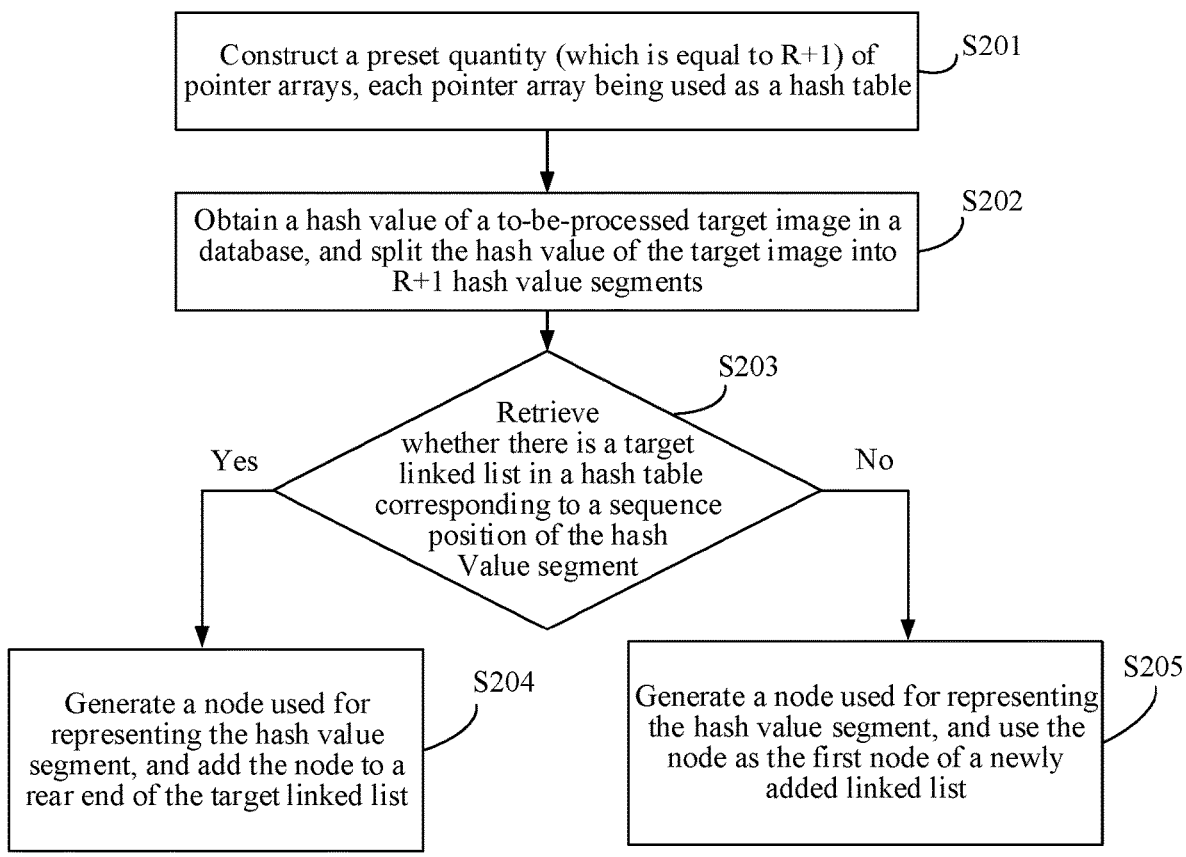
FIG. 2a is a schematic flowchart of constructing a hash table according to an embodiment of this application.

For example, FIG. 2a is a schematic flowchart of generating a hash table for storing hash value segments according to an embodiment of this application. The process may be performed by the application server or the retrieval server, and the process may include the following steps:

S201: Construct a preset quantity (which is R+1) of pointer arrays, each pointer array being used as a hash table.

R+1 represents the preset quantity, and the preset quantity is the foregoing preset threshold R, which is specified for the hamming distance, plus 1.

A length of the pointer array may be set as required. For example, a pointer array with a length of $2^{16}$ may be used. The length of the pointer array may also be set dynamically to satisfy a data structure need.

In this embodiment, each pointer array, as a hash table, is used for storing hash value segments at a specific sequence position, split from hash values of images. For example, assuming that the hash value of each image is split into four hash value segments, it indicates that the hash value of the image has four sequentially connected hash value segments. Sequence positions of the four hash value segments are different, and the sequence positions may be the first position hash value segment, the second position hash value segment, the third position hash value segment, and the fourth position hash value segment of the hash value in sequence. Correspondingly, four hash tables need to be constructed, and the four hash tables are used for recording the first, the second, the third, and the fourth position hash value segments respectively.

S202: Obtain a hash value of a to-be-processed image in a database, and split the hash value of the image into R+1 hash value segments.

Each hash value segment corresponds to a sequence position in the hash value of the image, and sequence positions of different hash value segments in the hash value are different. The sequence position of the hash value segment represents a sequence position of the hash value segment in the hash value, and is also a sequence position of the hash value segment in the plurality of consecutive hash value segments. For example, a hash value segment is the second position hash value segment in the hash value according to a positive sequence order, and the sequence position of the hash value segment is correspondingly the second position.

A hash value of an image may be obtained by extracting a feature of the image. The method used to extract the hash value of the image is not limited in this application. For a process of splitting a hash value of an image into hash value segments, refer to the foregoing related descriptions, and details are not described herein again.

Step S202 may include: when the database has stored the image and the hash value of the image, obtaining the hash value of the image that has been stored in the database, splitting the hash value into hash value segments, and further generating a hash table according to the split hash value segments; or if an image to be stored in the database is found, generating a hash value of the image first, then splitting the hash value to obtain hash value segments, and further storing the image, the hash value of the image, and the hash value segments of the image into the database.

S203: Determine, for any hash value segment according to a sequence position of the hash value segment in the hash value, a hash table corresponding to the sequence position, and retrieve, in the hash table, whether there is a linked list used for recording the hash value segment; and if yes, perform step S204; or if not, perform step S205.

The hash table corresponding to the sequence position is used for storing information of hash value segments that are at the specific sequence position in hash values of different images. For example, if the hash value segment is determined to be the second hash value segment in the hash value of the image according to the sequence position of the hash value segment, a hash table used for storing the second hash value segment needs to be determined.

The pointer array represented by each hash table stores at least one linked list. Each linked list includes a plurality of nodes. Each node records a hash value segment, and may further record image information to which the hash value segment belongs. For example, an identifier of an image to which the hash value segment belongs or a hash value of an image to which the hash value segment belongs. Hash value segments stored in different nodes in the same hash table belong to different images. The node may further has a pointer that points to a next node in the linked list.

In this embodiment of this application, nodes in one linked list are used for storing hash value segments at the same sequence position corresponding to hash values of different images, and hash value segments in the nodes in the same linked list are the same. In this way, when a particular hash value segment is subsequently searched for in the hash table, a linked list including the hash value segment may be directly located. All images with hash value segments at the corresponding sequence position the same as the hash value segment may be directly found according to image information included in the nodes in the linked list.

Correspondingly, once after the hash table corresponding to the sequence position is determined, the next step is to retrieve, in the hash table, whether there is a linked list used for recording the hash value segment, so that the hash value segment of the image is subsequently recorded into a node of the linked list. In this way, all hash value segments at a corresponding sequence position in hash values of different images are grouped together.

In one implementation, for ease of distinguishing, an index may be constructed for each linked list, and the index is used for representing content of a hash value segment recorded in each node of the linked list. For example, the index may be a hash value segment stored in a node of the linked list. For example, the hash value segment in the first node of the linked list may be used as the index of the linked list.

S204: Generate a node used for representing the hash value segment, and add the node to a rear end (also referred to as a tail) of the linked list.

If the linked list used for recording the hash value segment exists, a node including the hash value segment may be generated, and the node is added (or appended) to the rear end of the linked list.

S205: Generate a node used for representing the hash value segment, and use the node as the first node (also referred to as a head node) of a newly added linked list in the hash table.

Correspondingly, if there is no linked list used for recording the hash value segment, it indicates that the hash table currently has not stored a hash value segment that is the same as the hash value segment. In this case, a linked list used for recording the hash value segment may be created with a generated node that includes the hash value segment as the first node of a linked list.

By using step S202 to step S205, information of hash value segments of an image may be stored into hash tables, based on sequence positions of the hash value segments corresponding to the hash value of the image.

Figure 2B:
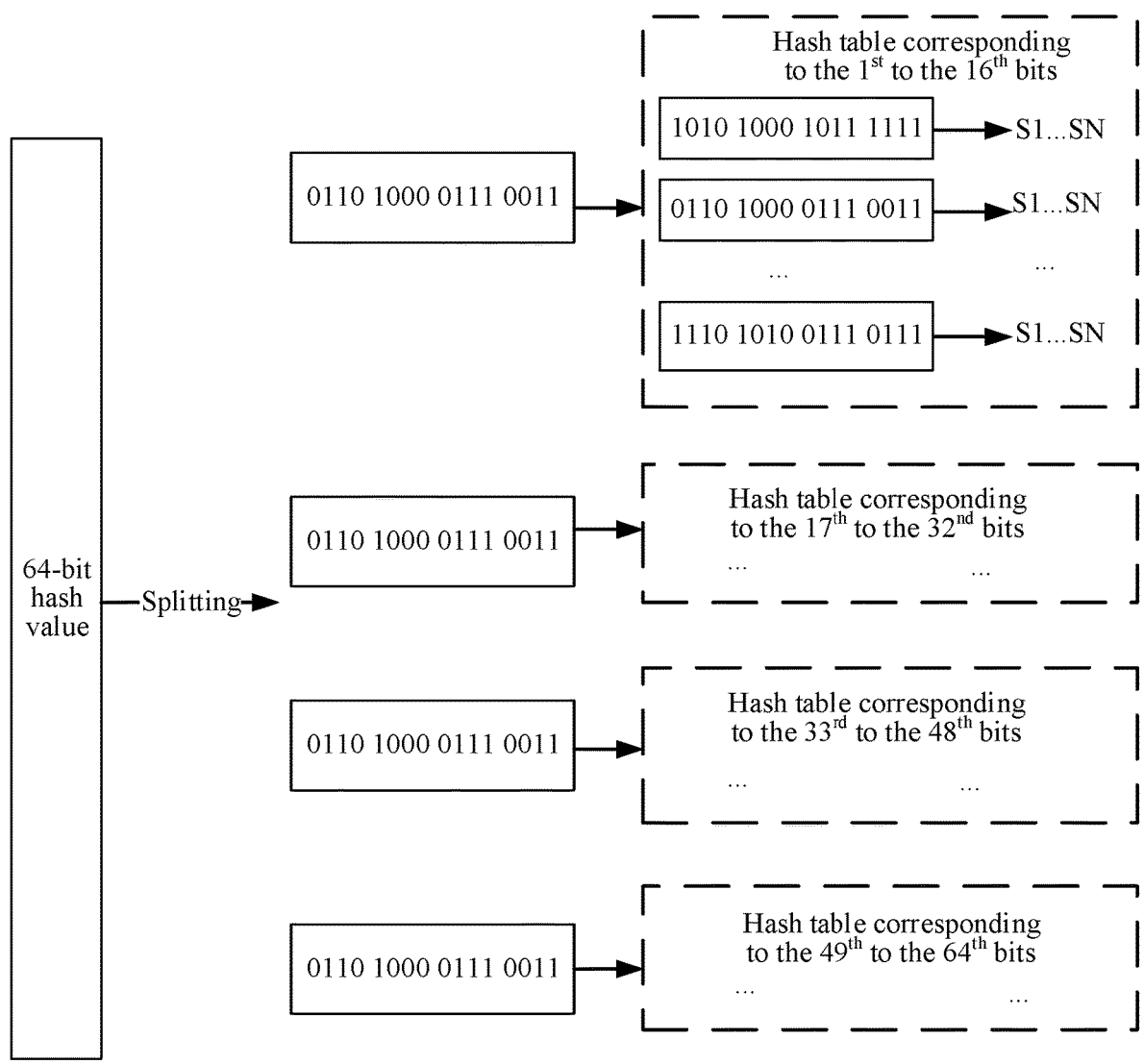
FIG. 2b is a schematic diagram of storing hash value segments obtained by splitting a hash value of an image to different hash tables.

For ease of understanding the process in FIG. 2a, the foregoing process is described by using an example below. It is assumed that the hash value of the image has 64 bits, and the hash value of the image is split into four segments to obtain four hash value segments. Referring to FIG. 2b, which shows an example of storing the four hash value segments split from the hash value of the image into hash tables.

As shown in FIG. 2b, assuming that the 64-bit hash value of the image is 0110 1000 0111 0011 1001 0110 1110 1010 1111 0001 1100 1001 1110 0001 0001 1111. The first position hash value segment split from the hash value of the image is 0110 1000 0111 0011, the second position hash value segment is 1001 0110 1110 1010, the third position hash value segment is 1111 0001 1100 1001, and the fourth position hash value segment is 1110 0001 0001 1111. It should be noted that throughout this application, the first position, second position, third position, and fourth position hash value segment merely indicate the position of the particular segment in the hash value, and are not to be interpreted as the "first hash value segments" or "second hash value segments".

Correspondingly, the first position hash value segment of the image needs to be stored into a corresponding hash table used for storing hash value segments formed by the first 1-16 bits. As shown in FIG. 2b, the first hash table is a hash table marked with first 1-16 bits.

Further, it needs to detect whether the hash table has a linked list used for storing hash value segment "0110 1000 0111 0011". In FIG. 2b, a specific value of a hash value segment stored in a linked list is used as an index of the linked list. For example, referring to FIG. 2b, each row in the first hash table is a linked list. In this way, for example, the first position hash value segment "0110 1000 0111 0011" of the image may be used as a pointer to locate the linked list with an index of "0110 1000 0111 0011". Next, a node used for storing the first position hash value segment is generated for the image. In addition, related information of the image, such as the hash value of the image and a storage location of the image in the database, is stored in the node, and the node is added to the located linked list. On the other hand, if no linked list with an index of "0110 1000 0111 0011" is located, a new linked list may be created with the node as the first node of the linked list, as described above.

As shown in FIG. 2b, in the hash table corresponding to the 1$^{st}$ to the 16$^{th}$ bits, S1 . . . SN represent nodes in each linked list. Each linked list may include a plurality of nodes, and the quantities of nodes included in the linked lists may be the same, or may be different.

Similarly, the second, the third, and the fourth position hash value segments of the image may be stored into the second, the third, and the fourth hash tables respectively, which is not shown explicitly in FIG. 2b. The process is similar to the process of storing the first position hash value segment, and details are not described herein again.

In the process as shown in FIG. 2a, for a hash table corresponding to any sequence position, information of different images having the same hash value segment at the sequence position is stored into one linked list. In another implementation, only hash tables corresponding to different sequence positions need to be created and used, no linked list is needed. In this case, hash value segments at different sequence positions corresponding to hash values of images as well as related information are recorded into corresponding hash tables respectively. For example, in step S203, after the hash table corresponding to the sequence position is determined, the hash value segment and the image to which the hash value segment belongs may be stored into the hash table corresponding to the sequence position of the hash value segment.

In one implementation, the hash table may be implemented by a pointer array. In another implementation, the hash table may be stored in another data storage form or data structure. For example, the hash table may alternatively be implemented as a folder, and the folder stores one or more subsequent linked lists.

Figure 3:
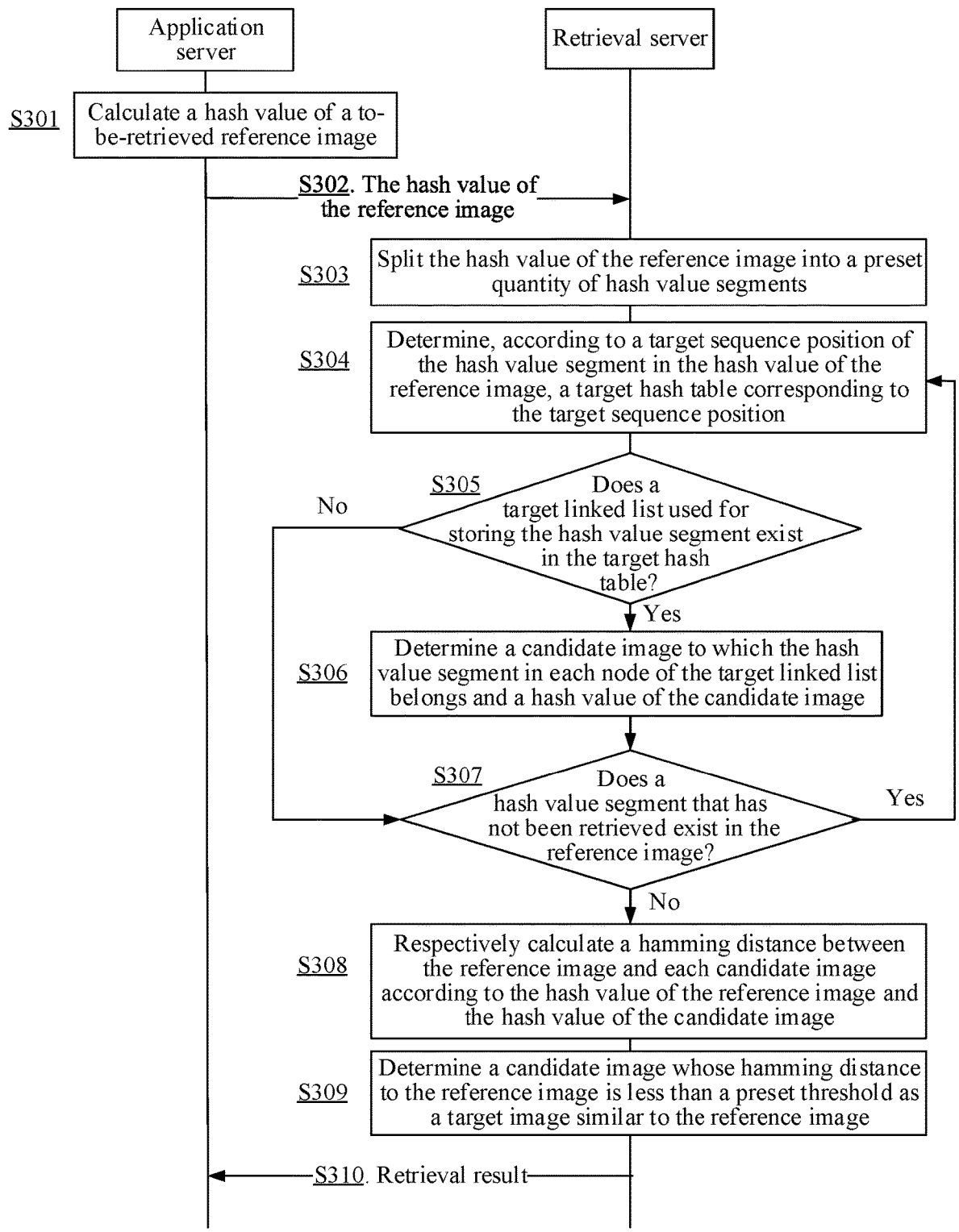
FIG. 3 is a schematic flowchart of an image retrieval method according to an embodiment of this application.

FIG. 3 is a schematic flowchart of an embodiment of an image retrieval method according to this application. The method in this embodiment may include the following steps:

S301: An application server obtains a to-be-retrieved reference image, and calculates a hash value of the reference image.

For example, the application server may receive an image retrieval instruction transmitted by a client, the image retrieval instruction carrying the to-be-retrieved image. For another example, the application server obtains a to-be-retrieved image which is preset in specified storage space. For different scenarios, manners of obtaining the to-be-retrieved image by the application server may be different.

In this embodiment of this application, for ease of distinguishing, a to-be-retrieved image is referred to as a reference image. The hash value of the reference image is a binary code representing an image feature of the reference image.

S302: The application server transmits the hash value of the reference image to a retrieval server.

For example, the application server transmits a retrieval request to the retrieval server, the retrieval request carrying the hash value of the reference image.

S303: The retrieval server splits the hash value of the reference image into a preset quantity of hash value segments.

Each hash value segment includes a value of at least one bit, and the preset quantity of hash value segments can form the hash value of the reference image when combined according to the order of the sequence position.

For a process of splitting the hash value of the reference image into the preset quantity of consecutive hash value segments, refer to the process of splitting a hash value of an image described above.

In one implementation as shown in FIG. 3, the application server calculates the hash value of the to-be-retrieved reference image. In another alternative implementation, the application server may transmit the reference image to the retrieval server directly, and the retrieval server determines the hash value of the reference image.

S304: For each hash value segment split from the hash value of the reference image, the retrieval server locates, according to a target sequence position of the hash value segment in the hash value of the reference image, a target hash table corresponding to the target sequence position.

In this embodiment of this application, for ease of distinguishing, a sequence position of a currently processed hash value segment is referred to as a target sequence position.

In step S304, the target hash table may be queried from a database. Alternatively, the target hash table may be located from the hash tables cached by the retrieval server.

S305: The retrieval server detects whether a target linked list used for storing the hash value segment exists in the target hash table; if yes, perform step S306; if not, perform step S307.

Considering the complexity of images in the database, generally, each hash table may include at least two linked lists.

A hash value segment stored in each node of the target linked list is the same as the hash value segment corresponding to the reference image.

S306: The retrieval server determines a candidate image associated with the hash value segment in each node of the target linked list and a hash value of the candidate image.

If the target linked list is detected, an image whose hash value segment in the target sequence position is the same as the matching hash value segment of the reference image exists in the database. As described before, the matching hash value segment is the segment with the same sequence position in the hash value. For ease of distinguishing, an image corresponding to the hash value segment in each node of the target linked list is referred to as a candidate image. Hash value segments in at least one sequence position of the candidate image and the reference image are the same. Therefore, the candidate image may be an image similar to the reference image.

A hash value of the candidate image may be obtained a from the database. Alternatively, if the node stores the hash value of the candidate image, the hash value of the candidate image may be obtained directly from the node.

S307: The retrieval server determines whether there is any hash value segment in the plurality of hash value segments corresponding to the reference image which has not been retrieved or processed yet, and if yes, return to step S304, to determine a target hash table according to a target sequence position of the hash value segment that has not been retrieved.

For a hash value segment in a certain sequence position corresponding to the reference image, if a corresponding target linked list is not found from a corresponding target hash table, then it indicates that there is no image having the hash value segment at the sequence position in the database. In this case, it may be detected whether other hash value segments corresponding to the reference image have all been retrieved, to determine whether retrieval of all hash value segments of the reference image is completed.

It may be understood that steps S304, S305, and S306 need to be performed for each hash value segment of the reference image. Furthermore, each hash value segment may be retrieved sequentially or concurrently.

It may be understood that in actual application, step S307 may not be performed after S305 and S306; instead, subsequent step S308 may be directly performed after the candidate image is retrieved. For example, if the target linked list corresponding to the hash value segment is not found in step S305, processing of the current hash value segment may be ended, but processing of detecting a target linked list according to another hash value segment is still performed. For another example, if the hash value segments of the reference image are retrieved concurrently, the hash value segments are all retrieved at the same time, and therefore, step S307 may not need to be performed.

In one implementation, hash value segments are stored in a hash table corresponding to the sequence positions directly. In this case, after the target hash table is determined in step S304, the retrieval server further determines whether a candidate hash value segment which is the same as the hash value segment corresponding to the reference image exists in the target hash table, to subsequently determine a candidate image associated with the candidate hash value segment and a hash value of the candidate image.

In this embodiment of this application, for ease of distinguishing the hash value of the reference image and the hash value of the candidate image, the hash value of the reference image may also be referred to as a first hash value, and the hash value segment split from the first hash value is referred to as a first hash value segment. The hash value segment that is located from the hash table and that is the same as the first hash value segment is referred to as a second hash value segment, that is, the hash value of the candidate image is referred to as a second hash value, and the hash value segment split from the second hash value is referred to as the second hash value segment.

S308: The retrieval server respectively calculates, according to the hash value of the reference image and the hash values of the candidate images, a hamming distance between the reference image and each candidate image.

The hamming distance is the quantity of different characters at the same position in hash values of two images. In this application, the hamming distance may be calculated in a plurality of manners, which is not limited herein.

A plurality of candidate images may be located according to a hash value segment of the reference image. Therefore, in step S308, the hamming distance between the reference image and each located candidate image needs to be calculated respectively.

S309: The retrieval server determines a candidate image whose hamming distance to the reference image is less than a preset threshold as a target image similar to the reference image.

It may be understood that, in steps S303 to S307, the candidate images that may be similar to the reference image are first determined from the database. After the candidate images are determined, the target image similar to the reference image may be retrieved according to the method in steps S308 and S309, based on the hamming distance. Alternatively, the target image similar to the reference image may be retrieved from the determined candidate images in manners other than hamming distance, which is not limited herein.

One candidate image may be located multiple times according to different hash value segments of the reference image. For example, if the hash value of the reference image is completely the same as the hash value of the candidate image, the candidate image can be located according to each hash value segment split from the hash value of the reference image. To avoid duplicate operations, after all candidate images are determined, duplicate candidate images may be removed first. Alternatively, after a hamming distance between the candidate image and the reference image is calculated, if the same candidate image is located again subsequently, the calculation of the hamming distance may be skipped.

S310: The retrieval server sends a feedback of a retrieval result to the application server according to the target image similar to the reference image.

For example, the target image similar to the reference image is transmitted to the application server, or a quantity of the target images similar to the reference image (related information such as an image source may be further included) is transmitted to the application server.

From above descriptions, two images are similar when a hamming distance between the two images is less than a preset threshold. If hash values of the two images are split into a quantity of hash value segments, the quantity being a preset threshold plus 1 (or plus any natural number not less than 1), at least one hash value segment is completely the same in the two images. Based on this principle, in this embodiment of this application, after the hash value of the to-be-retrieved reference image is obtained, the hash value of the reference image is first split into the preset quantity of consecutive hash value segments, and candidate images having the same hash value segment in the sequence position are retrieved according to the sequence position of the hash value segment in the hash value of the reference image, so the candidate images that may be similar to the reference image may be selected from the database, and other images that cannot be similar to the reference image are excluded from further processing. A data processing amount of retrieving images that have the same hash value segment in the same sequence position is relatively small, and can almost be ignored compared with a calculation amount of calculating the similarity. In addition, compared with all images in the database, the data amount of the selected candidate images is greatly reduced. In this way, the target image may be determined by calculating only the similarity between the reference image and a relatively small quantity of candidate images, thereby greatly reducing the calculation amount of image retrieval and improving image retrieval efficiency.

In addition, the same hash table stores hash value segments in the same sequence position of hash values of different images, and information of different images having the same hash value segment in the sequence position is respectively stored into nodes in a linked list. Therefore, according to a hash value segment of the reference image, candidate images corresponding to all the hash value segments that are in the sequence position and that are the same as the hash value segment of the reference image can be directly located, thereby further reducing time consumed by selecting the candidate images.

For ease of understanding the beneficial effects of this application, description is made by using an example below.

Assuming that a database stores hash values of 100 million images, if hamming distances between a reference image and each image in the database is calculated sequentially, the hamming distance needs to be calculated for 100 million times.

Assuming each hash value has 64 bits, and two images are considered to be similar if the hamming distance is less than 3. According to the solution of this application, the hash value of each image is split into four 16-bit hash value segments, and the hash value segments are respectively stored into four hash tables. In addition, in each hash table, identical hash value segments that belong to different images are stored in the form of a linked list. Therefore, after the hash value of the reference image is split into four hash value segments, for each 16-bit hash value segment, during searching of candidate images, a candidate image represented by each node in the linked list may be located simply based on the hash value segment, and the time complexity is O(1). Time consumption of image retrieval mainly depends on the number of times of calculating the hamming distance between the reference image and the candidate image represented by each node in the linked list. For example, each linked list in the hash table is a pointer array with a length of $2^{16}$, where $2^{16}$ includes 65536 bits. Because each hash table needs to store one hash value segment in hash values of the 100 million images, a maximum length of each linked list is 100 million/65536=1526 times. Because the reference image corresponds to four hash value segments, at most four linked lists will be found. Therefore, a maximum number of times of calculating the hamming distance is 1526*4=6104, which is far less than 100 million times, and retrieval efficiency is greatly improved.

In one implementation, the retrieval server may be a single server. In another implementation, to deal with relatively large data processing amount and improve image retrieval efficiency, the retrieval server may be replaced with a distributed system comprising a plurality of retrieval servers. When a server cluster formed by a plurality of retrieval servers in used, the operation of the server cluster is similar to that of a single retrieval server, except each retrieval server is responsible for retrieving different set of images. However, the process of retrieving an image is the same.

Because a plurality of hash value segments split from the hash value of each image is stored into a plurality of hash tables, and each hash table further needs to store information of the image, the retrieval server needs to load a relatively large amount of data into the memory. For example, if a node stores a hash value segment and related information of an image associated with the hash value segment, each node may need to occupy 64-bit space, and 100 million images need 6.4 G space. If a single retrieval server is used, the memory of the retrieval server may be insufficient, and once a fault occurs, the retrieval service cannot be provided. As such, if a distributed cluster formed by a plurality of retrieval servers is used, the frequency of occurrence of insufficient memory can be reduced, and stability of the retrieval service can be improved.

To allocate a retrieval task to each retrieval server in the server cluster, in this embodiment of this application, the retrieval server cluster may include at least one master server and a plurality of slave servers.

Figure 4:
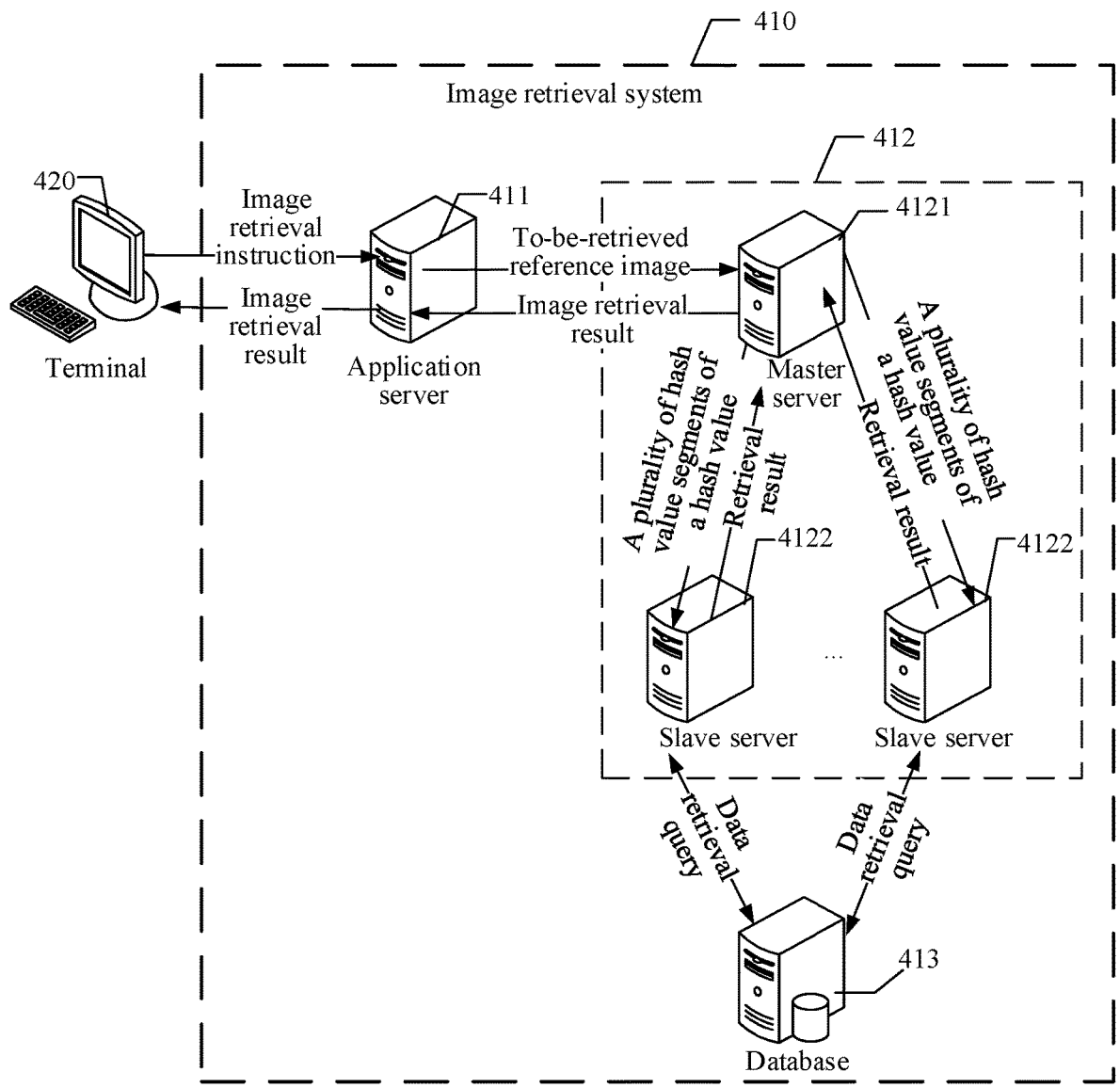
FIG. 4 is a schematic diagram of an exemplary compositional structure of another application scenario for an image retrieval method according to an embodiment of this application.

For example, FIG. 4 is a schematic diagram of a compositional structure of an image retrieval method.

This embodiment includes: an image retrieval system 410 and a terminal 420. The image retrieval system includes: an application server 411, a retrieval server cluster 412, and a database 413.

The retrieval server cluster 412 includes a master server 4121 and a plurality of slave servers 4122.

The master server 4121 may allocate a retrieval task to the plurality of slave servers 4122, so the plurality of slave servers 4122 may complete the allocated retrieval task.

The master server 4121 may allocate the retrieval task to the slave server 4122 in a plurality of manners.

In one implementation, the master server 4121 may configure a storage area of the database for each slave server 4122, and logically allocate these storage areas to the plurality of slave servers 4122. Correspondingly, when performing the retrieval task, the slave server 4122 only performs retrieval in the allocated storage area of the database which is assigned by the master server 4121.

Figure 5:
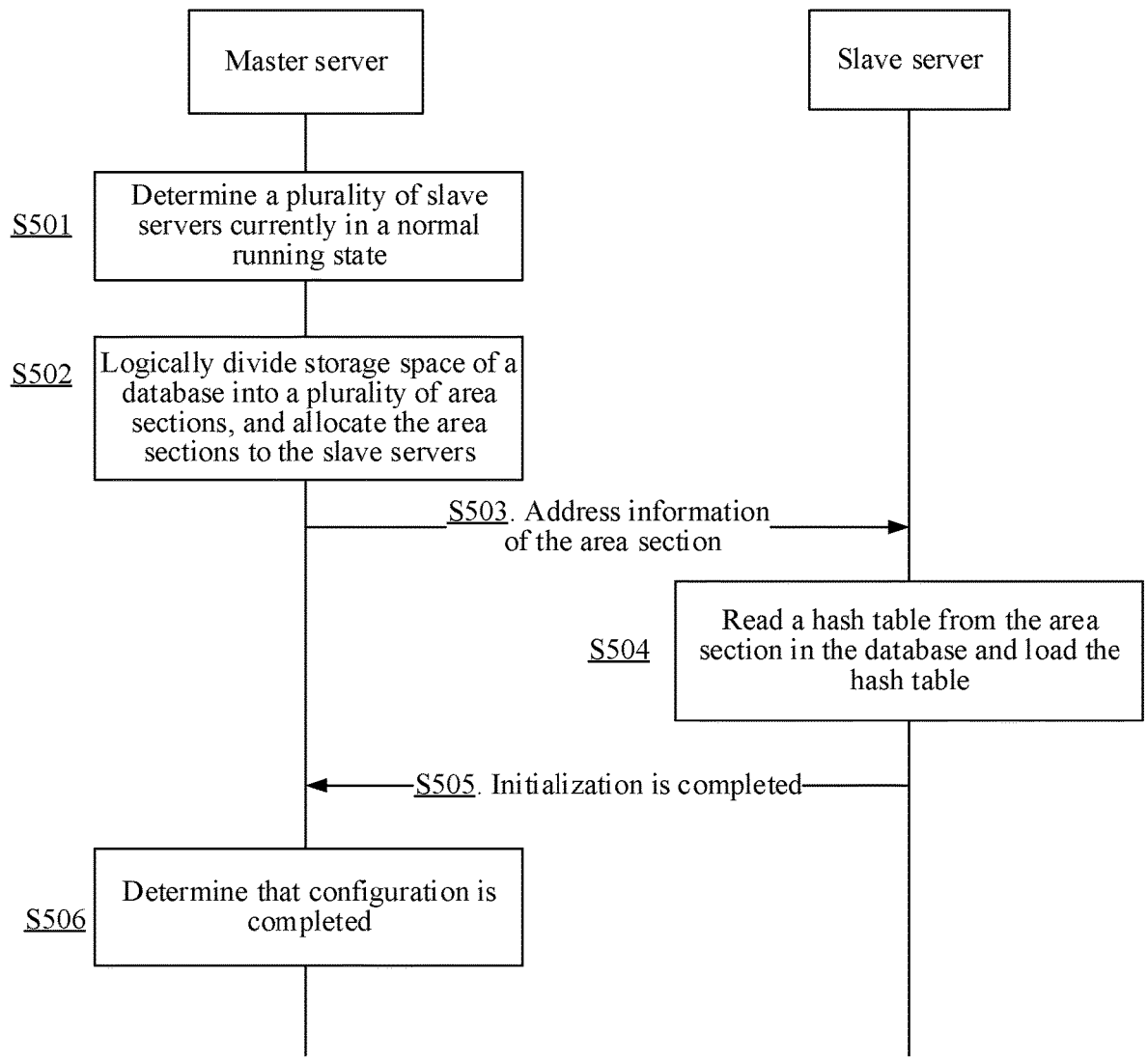
FIG. 5 is a schematic flowchart of a master server configuring a slave server according to an embodiment of this application.

For ease of understanding, a configuration procedure for configuring the slave server 4122 by the master server 4121 is described first. For example, referring to FIG. 5, the configuration procedure may include the following steps:

S501: A master server determines a plurality of slave servers currently in a normal running state.

For example, the master server may detect, based on a heartbeat mechanism, whether each slave server runs normally (commonly referred to as "in a alive state"). For example, the master server may periodically send heartbeat messages to all the slave servers, and each slave server correspondingly replies with a heartbeat response message to the master server if receiving the heartbeat message. In this way, upon receiving the heartbeat response message from the slave server, the master server can determine that the particular slave server is in a normal running state.

Correspondingly, the master server may store a file used for recording the working state of each slave server, to help determine each slave server currently in a normal running state according to the file.

S502: The master server logically divides storage space of a database into a plurality of area sections, and allocates the plurality of area sections to the plurality of slave servers, so that each slave server in a normal running state is responsible for at least one area section.

The storage space of the database may be all storage space regardless if there is data, or may be storage space with data stored. In this embodiment of this application, the storage space of the database is divided into a plurality of small storage spaces, and each small storage space is referred to as an area section. Sizes of the storage spaces corresponding to the area sections may be the same, or may be different.

For example, the master server divides, according to a total quantity of the plurality of slave servers in the normal running state, the storage space of the database into the total quantity of area sections, and respectively allocates one area section to each slave server. In this way, each slave server is responsible for one of the area sections in the database.

For another example, the master server may divide the plurality of slave servers into a plurality of groups of servers, and each group of servers includes at least two slave servers. In this case, the master server may divide, according to a quantity of slave servers in each group of servers, the storage space of the database into area sections with a quantity equals to the quantity of slave servers in each group, and respectively allocate the divided area sections to the servers in the server group.

There may be other possible manners to configure the area section for the slave server, which are not limited herein.

The master server may further store a configuration file of each slave server, to allocate to each slave server an area section that the slave server is responsible for. The configuration file may record parameters such as memory space and performance of the slave server. In this way, when the area section of the database is allocated to the slave server, the size of the storage space corresponding to the area section allocated to the slave server may be determined with reference to the parameters of the slave server.

S503: The master server transmits address information of the area section to the slave server which the slave server is responsible for.

For example, the master server allocates an area section with an address of 0 to 10 in the storage space of the database to one slave server, and allocates an area section with an address of 11 to 20 to another slave server, and so on. Correspondingly, the master server may transmit information about the address of 0 to 10 corresponding to the area section to the assigned slave server.

S504: The slave server reads, from the database according to the address information of the allocated area section, a hash table in the area section for which the slave server is responsible, and loads the obtained hash table into memory of the slave server.

It may be understood that, after obtaining the address information of the allocated area section, the slave server may obtain the hash table stored in the area section, and load the hash table into the memory to complete initialization of the hash table. In this way, the slave server may directly query the hash table cached in the memory subsequently, to reduce the number of times of accessing the database.

In one implementation, the slave server may not perform step S504. Instead, after receiving a to-be-retrieved hash value segment indicated by the master server, the slave server queries a corresponding hash table from the area section in the database according to the hash value segment.

S505: The slave server transmits an initialization completion message to the master server after completing hash table loading.

S506: The master server determines the configuration of the slave servers is completed, after receiving the initialization completion messages from each of the slave servers.

The foregoing steps S505 and S506 are performed to update the master server with configuration progress, to ensure that all the slave servers complete configuration.

It may be understood that, after the master server determines that configuration of the slave server is completed, to ensure stability of the retrieval system, the master server may still monitor whether the running state of the slave server is normal. For example, the master server may monitor the running state of the slave server by using the heartbeat mechanism mentioned above. When detecting that a running exception (for example, server is down) occurs in the slave server, the master server first determines an area section for which the slave server is responsible, then the master server allocates the determined area section to at least one other slave server, to ensure stability of the retrieval system.

For example, the impacted area section caused by slave server running exception is evenly allocated to other slave servers, so that capacity of the area sections allocated to other servers is increased. After obtaining the area section newly allocated by the master server, the slave servers may still perform the related operation according to the foregoing step S504.

After determining that configuration of the slave servers is completed, the master server may receive a to-be-retrieved reference image or a hash value of the reference image transmitted by the application server.

Figure 6:
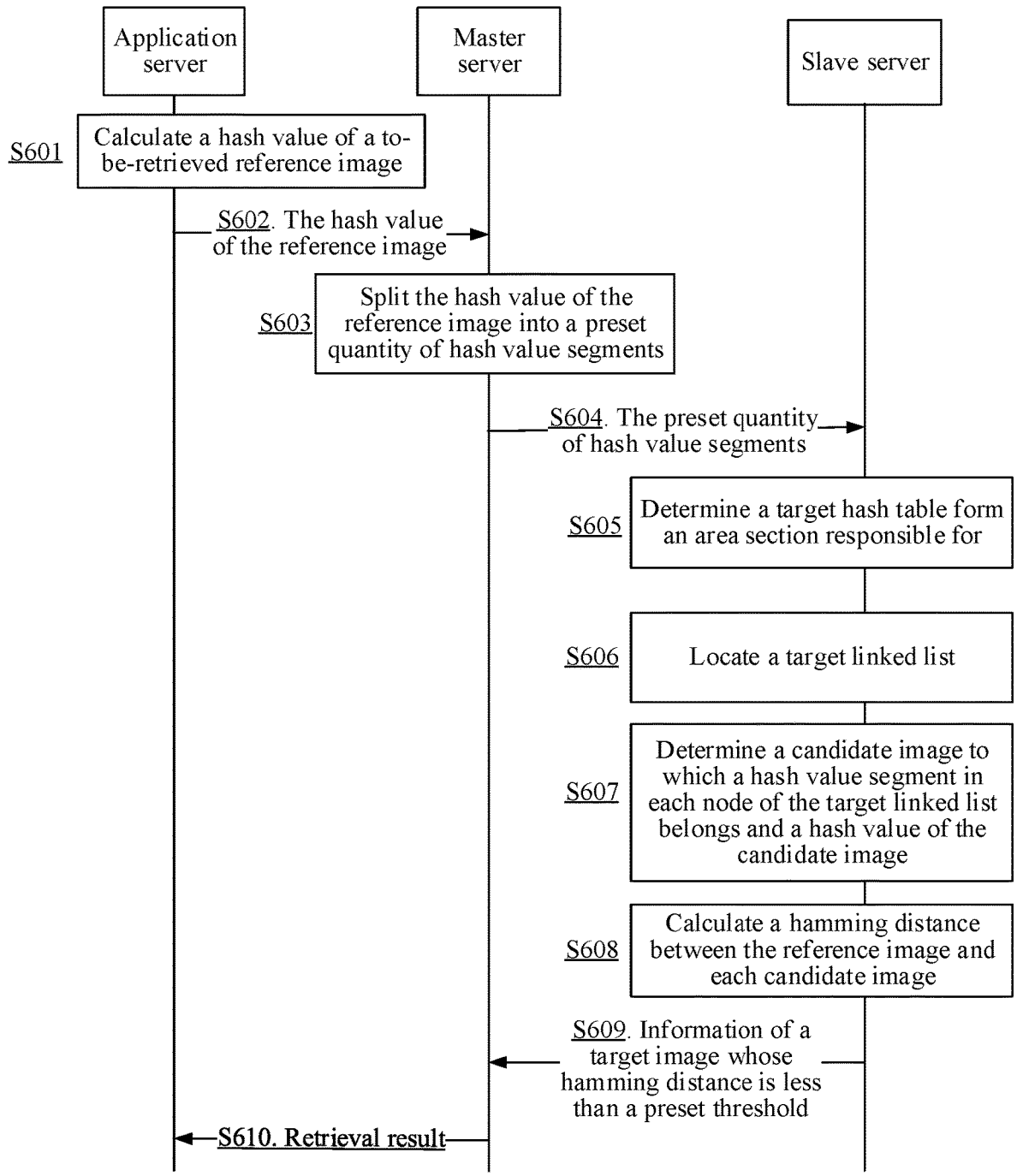
FIG. 6 is another schematic flowchart of an image retrieval method according to an embodiment of this application.

For example, FIG. 6 is a schematic flowchart of another embodiment of another image retrieval method according to this application. In the method in this embodiment, description is made by using an example in which image retrieval is implemented by a retrieval server cluster, and this embodiment may include the following steps:

S601: An application server obtains a to-be-retrieved reference image, and calculates a hash value of the reference image.

S602: The application server transmits the hash value of the reference image to a master server in a retrieval server cluster.

Similar to the foregoing embodiment, the application server may directly transmit the reference image to the master server, and the master server calculates the hash value of the reference image. Alternatively, the application server and the master server may be one server.

S603: The master server splits the hash value of the reference image into a preset quantity of hash value segments.

The hash value of the reference image may also be referred to as a first hash value, and the hash value segment split from the hash value of the reference image may also be referred to as a first hash value segment.

For steps S601 to S603, refer to the related description in the foregoing embodiment, and details are not described herein again.

S604: The master server transmits the preset quantity of hash value segments corresponding to the reference image to each slave server.

As described above, each slave server is respectively responsible for an area section corresponding to storage space of a database. Therefore, by transmitting the preset quantity of hash value segments to the plurality of slave servers, searching may be performed in different area sections of the database concurrently by using the plurality of slave servers, thereby improving search efficiency.

S605: The slave server determines, for each hash value segment corresponding to the reference image according to a target sequence position of the hash value segment in the hash value of the reference image, a target hash table corresponding to the target sequence position from an area section for which the slave server is responsible in a database.

It may be understood that, because each slave server is responsible for one area section of the database, each slave server performs retrieval only in the area section for which the slave server is responsible, to locate the target hash table stored in the area section and corresponding to the target sequence position. The process is similar to the process of locating a target hash table mentioned above, except that a retrieval range of each slave server in the database is narrowed.

In certain cases, a target hash table corresponding to a target sequence position of a hash value segment may not exist in an area section for which a slave server is responsible, which indicates that the slave server is not responsible for this target hash table, and another slave server is responsible for this target hash table. In this case, the slave server may ignore related retrieval of candidate images corresponding to the hash value segment, and may continue to process another hash value segment.

In this embodiment, description is made by using an example in which the slave server queries, in real time, whether a target hash table exists in the database. In actual application, when the master server allocates an area section to a slave server, if the slave server has loaded a hash table corresponding to the area section, the slave server may directly retrieve, from hash tables cached in the memory (that is, hash tables belonging to the area section), whether there is a corresponding target hash table.

S606: The slave server locates, from the target hash table, a target linked list used for storing the hash value segment.

S607: The slave server respectively determines a candidate image to which a hash value segment in each node of the target linked list belongs and a hash value of the candidate image.

For example, the slave server queries, from the node, a storage address of the candidate image to which the hash value segment belongs, and then queries, from the database, the candidate image and the hash value of the candidate image according to the storage address.

For steps S606 and S607, detailed description related to the operations performed by the retrieval server has been given in the foregoing embodiments.

For ease of distinguishing, the hash value segment in the node of the target linked list may also be referred to as a second hash value segment.

The foregoing description is made by using an example in which a hash table includes a linked list. In another implementation, the hash table directly stores information of each hash value segment and candidate images. The slave server may directly determine, from the target hash table, the second hash value segment that is the same as the corresponding hash value segment of the reference image and information of candidate images to which the second hash value segment belongs. For the specific process, detailed description has been given in the foregoing embodiments.

S608: The slave server respectively calculates, according to the hash value of the reference image and the hash values of the candidate images, a hamming distance between the reference image and each candidate image.

The operations of the slave server in steps S605 to S608 may be similar to the operation process of the foregoing independent retrieval server, and details are not described herein again.

Because there are a relatively large quantity of slave servers, calculating the hamming distances by using the slave servers may improve calculation efficiency. Alternatively, in another implementation, after locating the candidate images, the slave servers may transmit the hash values of the located candidate images to the master server, and the master server calculates the hamming distance between the reference image and each candidate image.

S609: The slave server determines, from the candidate images, a target image whose hamming distance to the reference image is less than a preset threshold, and transmits information of the target image to the master server.

S610: The master server feeds back a retrieval result to the application server according to information of the target images returned by different slave servers.

For example, the master server transmits, to the application server, all the information of the target images returned by the slave servers, or transmits, to the application server, the total quantity of the target images returned by the slave servers; alternatively, the master server may transmit sources, identifiers, and the total quantity of the target images to the application server. Certainly, there may be other manners of feeding back the retrieval result, which are not limited in this application.

According to another aspect of this application, corresponding to the image retrieval method in this application, this application further provides an image retrieval apparatus.

Figure 7:
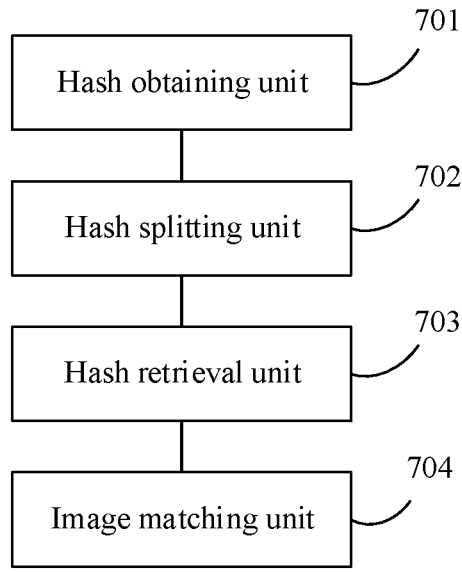
FIG. 7 is a schematic structural diagram of an image retrieval apparatus according to an embodiment of this application.

For example, FIG. 7 is a schematic diagram of a compositional structure of an embodiment of an image retrieval apparatus according to this application. The apparatus in this embodiment may be applied to the retrieval server or the retrieval server cluster mentioned above. The apparatus may include:

a hash obtaining unit 701, configured to obtain a first hash value of a to-be-retrieved reference image, wherein the first hash value is used for representing an image feature of the reference image;

a hash splitting unit 702, configured to split the first hash value into a preset quantity of first hash value segments, wherein each of the first hash value segments has a unique sequence position corresponding to the position of the first hash value segment in the first hash value;

a hash retrieval unit 703, configured to locate a target hash table according to the sequence position of the first hash value segment, and retrieve, from hash value segments of the target hash table, a second hash value segment that is the same as the first hash value segment, the target hash table being used for storing hash value segments that are at the sequence position of the first hash value segment in hash values of images; and an image matching unit 704, configured to search, from candidate images to which the second hash value segment belongs, a target image similar to the reference image.

In one implementation, the image matching unit may include:

a hash determining unit, configured to obtain second hash values of the candidate images to which the second hash value segment belongs, the second hash values being used for representing image features of the candidate images;

a distance calculation unit, configured to calculate hamming distances between the candidate images and the reference image according to the first hash value of the reference image and the second hash values of the candidate images; and a distance matching unit, configured to retrieve, from the candidate images to which the second hash value segment belongs, the target image whose hamming distance to the reference image is less than a preset threshold.

In one implementation, the target hash table located by the hash retrieval unit stores at least one linked list, each node in each linked list is used for storing a hash value segment that is at the sequence position of the first hash value segment in a hash value of an image, and hash value segments stored in nodes belonging to the same linked list are the same; and the hash retrieval unit includes:

a linked list locating subunit, configured to locate the target hash table according to the sequence position of the first hash value segment, and locate a target linked list used for storing the first hash value segment from the at least one linked list of the target hash table, the second hash value segment stored in each node of the target linked list being the same as the first hash value segment.

Further, each node of the linked list may store information of the image to which the hash value segment in the node belongs.

Correspondingly, the apparatus may further include: an image determining unit, configured to determine, according to the image information in each node of the target linked list, the candidate image to which the second hash value segment in each node of the target linked list belongs.

In one implementation, to construct a hash table and a linked list in the hash table in advance, the apparatus may further include: a linked list generation unit, configured to generate the linked list in the target hash table in the following manner:

obtaining a hash value of a to-be-processed image in a database;

splitting the hash value of the image into the preset quantity of hash value segments, sequence positions of different hash value segments in the hash value of the image being different;

locating, for each split hash value segment, a target hash table corresponding to the sequence position of the hash value segment, and detecting whether a linked list used for recording the hash value segment exists in the target hash table;

generating, if a linked list used for recording the hash value segment exists in the target hash table, a node recording the hash value segment, and adding the generated node to a rear end of the linked list used for recording the hash value segment; and generating, if a linked list used for recording the hash value segment does not exist in the target hash table, a node recording the hash value segment, and setting the generated node as the first node of a newly added linked list in the target hash table.

In one implementation, in the apparatus embodiment, the hash retrieval unit may include:

a hash transmitting subunit, configured to transmit the preset quantity of first hash value segments to a plurality of slave servers, so that the slave server queries, according to a target sequence position of the first hash value segment in the first hash value, the target hash table from an area section in which the slave server is responsible for retrieval, wherein the area section is a complete or partial storage area in storage space of a database; and a hash retrieval subunit, configured to retrieve, by using the slave server from the hash value segments of the target hash table, the second hash value segment that is the same as the first hash value segment; and the image matching unit includes:

a result receiving subunit, configured to receive a query result returned by the slave server, the query result including at least: information of the target image that is similar to the reference image and that is retrieved from the candidate images to which the second hash value segment belongs.

Further, the apparatus may further include:

a fault monitoring unit, configured to determine, if a faulty slave server is detected in the plurality of slave servers, an area section in which the faulty slave server is currently responsible for retrieval; and a re-allocation unit, configured to allocate the area section corresponding to the faulty slave server to at least one slave server in a normal running state.

Figure 8:
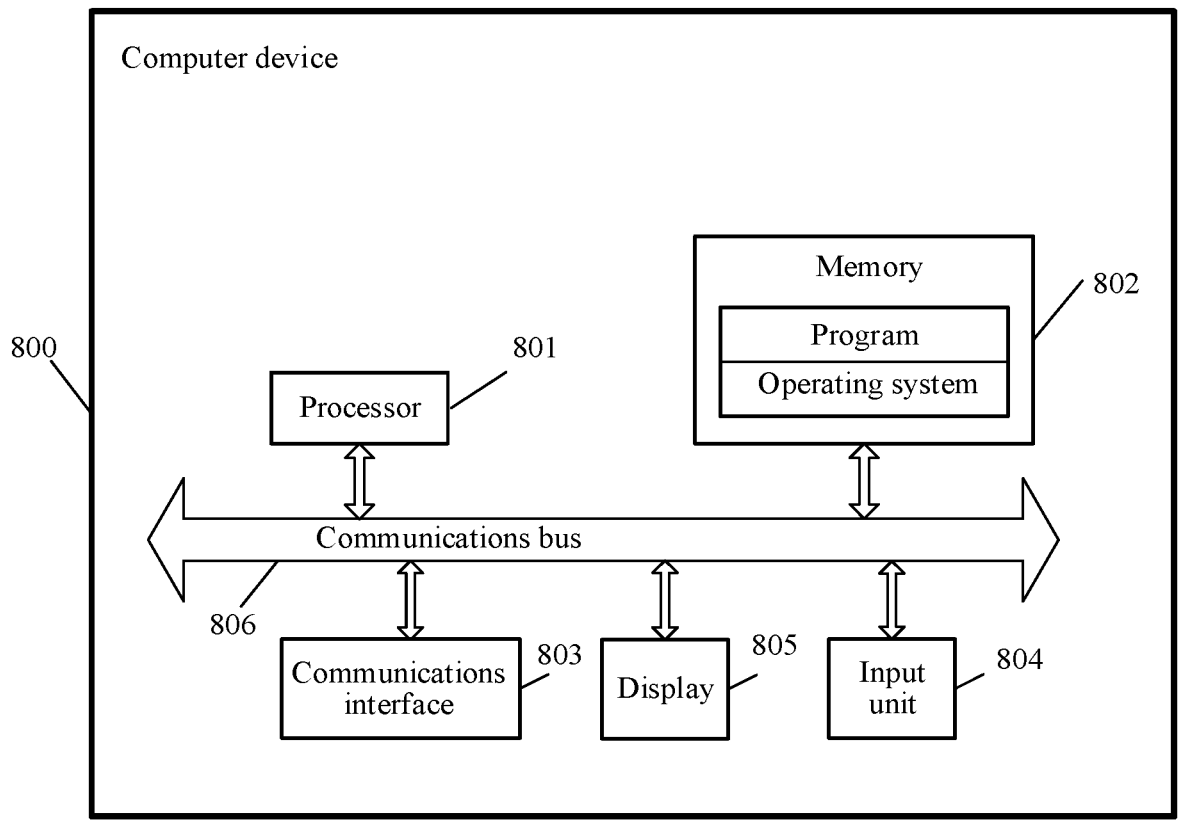
FIG. 8 is a schematic diagram of a compositional architecture of a server according to an embodiment of this application.

FIG. 8 is a schematic diagram of a compositional structure of a server to which an image retrieval method is applicable according to an embodiment of this application. The server may be a retrieval server. In FIG. 8, the server 800 may include: a processor 801 and a memory 802. Certainly, the server may further include a communications interface 803, an input unit 804, a display 805, and a communications bus 806.

The processor 801, the memory 802, the communications interface 803, the input unit 804, and the display 805 communicate with each other through the communications bus 806.

In this embodiment of this application, the processor 801 may be a central processing unit (CPU), an application-specific integrated circuit (ASIC), a digital signal processor (DSP), a field programmable gate array (FPGA), or another programmable logical device.

The processor may invoke a program stored in the memory 802. Specifically, the processor may perform the operations performed by the retrieval server or the master server side in FIG. 2a, FIG. 3, FIG. 5, and FIG. 6.

The memory 802 is configured to store one or more programs. The program may include program code, and the program code includes a computer operation instruction. In this embodiment of this application, the memory stores at least a program for implementing the following functions:

obtaining a first hash value of a to-be-retrieved reference image, the first hash value being used for representing an image feature of the reference image;

splitting the first hash value into a preset quantity of consecutive first hash value segments, sequence positions of different first hash value segments in the first hash value being different;

locating a target hash table according to the sequence position of the first hash value segment, and retrieving, from a plurality of hash value segments of the target hash table, a second hash value segment that is the same as the first hash value segment, the target hash table being used for storing hash value segments that are at the sequence position of the first hash value segment in hash values of images; and retrieving, from candidate images to which the second hash value segment belongs, a target image similar to the reference image. Optionally, the memory 802 may further store a program corresponding to any implementation of the image retrieval method.

In one implementation, the memory 802 may include a program storage area and a data storage area. The program storage area may store an operating system, an application program required by at least one function (such as a sound playback function and an image display function), and the like. The data storage area may store data, such as user data, user access data, and audio data, created according to a use process of the computer, and the like.

The communications interface 803 may be an interface of a communications module, for example, an interface of a GSM module.

The structure of the computer device shown in FIG. 8 constitutes no limitation on the computer device in this embodiment of this application. In actual application, the computer device may include more or fewer components than those shown in FIG. 8, or some components may be combined.

According to another aspect, this application further provides a storage medium, storing a computer program, and the computer program, when being loaded and executed by a processor, implementing the image retrieval method described in any one of the foregoing embodiments.

The embodiments in this specification are all described in a progressive manner, each embodiment focuses on a difference from other embodiments, and for same or similar parts in the embodiments, mutual reference may be made to these embodiments. An apparatus embodiment is basically similar to a method embodiment, and therefore is described briefly. For related parts, refer to partial descriptions in the method embodiment.

Furthermore, the relational terms herein such as first and second are used only to differentiate an entity or operation from another entity or operation, and do not require or imply any actual relationship or sequence between these entities or operations. In addition, the terms "include", "comprise", and any variants thereof are intended to cover a non-exclusive inclusion. Therefore, a process, method, object, or device that includes a series of elements not only includes such elements, but also includes other elements not specified expressly, or may include inherent elements of the process, method, object, or device. Unless otherwise specified, an element limited by "include a/an . . . " does not exclude other same elements existing in the process, the method, the object, or the device that includes the element.

The foregoing descriptions of the disclosed embodiments enable a person skilled in the art to implement or use the present disclosure. Various modifications to these embodiments are obvious to a person skilled in the art, the general principles defined in the present disclosure may be implemented in other embodiments without departing from the spirit and scope of the present disclosure. Therefore, the present disclosure is not limited to these embodiments illustrated in the present disclosure, but needs to conform to the broadest scope consistent with the principles and novel features disclosed in the present disclosure.

The foregoing descriptions are merely exemplary implementations of the present disclosure. A person of ordinary skill in the art may make various improvements and modifications without departing from the principle of the present disclosure, and the improvements and modifications are also to be regarded as the protection scope of the present disclosure.

What is claimed is:

1. An image retrieval method, applied to a server, comprising:
    obtaining a first hash value of a to-be-retrieved reference image, the first hash value being used for representing an image feature of the reference image;
    splitting the first hash value into a preset quantity of first hash value segments, wherein a first hash value segment of the first hash value segments has a unique sequence position corresponding to a position of the first hash value segment in the first hash value;
    locating a target hash table according to the sequence position of the first hash value segment, wherein the target hash table is used for storing hash value segments that are at the sequence position of the first hash value segment in hash values of images, and wherein the target hash table stores at least one linked list, each node in the linked list is used for storing a hash value segment that is at the sequence position of the first hash value segment in a hash value of an image, and hash value segments stored in nodes belonging to the same linked list are the same;
    locating a target linked list from the at least one linked list of the target hash table, a second hash value segment stored in each node of the target linked list being the same as the first hash value segment; and
    retrieving, from candidate images to which the second hash value segment belongs, a target image similar to the reference image.

2. The image retrieval method according to claim 1, wherein retrieving, from the candidate images to which the second hash value segment belongs, the target image similar to the reference image comprises:
    obtaining second hash values of the candidate images to which the second hash value segment belongs, the second hash value being used for representing image features of the candidate images;
    calculating hamming distances between the candidate images and the reference image according to the first hash value of the reference image and the second hash values of the candidate images; and
    retrieving, from the candidate images to which the second hash value segment belongs, the target image whose hamming distance to the reference image is less than a preset threshold.

3. The image retrieval method according to claim 1, wherein each node of the linked list further stores image information of the image to which the hash value segment in the node belongs; and
    after locating the target linked list from the at least one linked list of the target hash table, the method further comprises:
        obtaining, according to the image information in each node of the target linked list, a candidate image to which the second hash value segment in each node of the target linked list belongs.

4. The image retrieval method according to claim 1, wherein the linked list in the target hash table is generated in the following manner:
    obtaining a hash value of a to-be-processed image in a database;
    splitting the hash value of the image into the preset quantity of hash value segments, wherein a hash value segment of the hash value segments has a unique sequence position corresponding to the position of the hash value segment in the hash value;
    locating, for each split hash value segment, a target hash table corresponding to the sequence position of the hash value segment, and detecting whether a linked list used for recording the hash value segment exists in the target hash table;
    generating, if a linked list used for recording the hash value segment exists in the target hash table, a node recording the hash value segment, and adding the generated node to a rear end of the linked list used for recording the hash value segment; and
    generating, if a linked list used for recording the hash value segment does not exist in the target hash table, a node recording the hash value segment, and setting the generated node as the first node of a newly added linked list in the target hash table.

5. The image retrieval method according to claim 1, wherein locating the target hash table according to the sequence position of the first hash value segment comprises:
    transmitting the preset quantity of first hash value segments to a plurality of slave servers, so that each slave server queries, according to the sequence position of the first hash value segment, the target hash table from an area section in which the slave server is responsible for retrieval, wherein the area section is a partial storage area in storage space of a database;
    locating the target linked list from the at least one linked list of the target hash table comprises:
        locating, by the slave server, the target linked list from the at least one linked list of the target hash table, a second hash value segment stored in the each node of the target linked list being the same as the first hash value segment; and
    retrieving, from candidate images to which the second hash value segment belongs, the target image similar to the reference image comprises:
        receiving a query result returned by the slave server, the query result comprising at least: information of the target image that is similar to the reference image, wherein the target image is retrieved from the candidate images to which the second hash value segment belongs.

6. The image retrieval method according to claim 5, further comprising:
    determining, when a faulty slave server is detected in the plurality of slave servers, an area section in which the faulty slave server is currently responsible for retrieval; and
    allocating the area section corresponding to the faulty slave server to at least one slave server in a normal running state.

7. An apparatus for image retrieval, comprising a memory for storing computer readable instructions and a processor in communication with the memory, wherein the processor is configured to execute the computer readable instructions to cause the apparatus to:

obtain a first hash value of a to-be-retrieved reference image, the first hash value being used for representing an image feature of the reference image;

split the first hash value into a preset quantity of first hash value segments, wherein a first hash value segment of the first hash value segments has a unique sequence position corresponding to the position of the first hash value segment in the first hash value;

locate a target hash table according to the sequence position of the first hash value segment, wherein the target hash table is used for storing hash value segments that are at the sequence position of the first hash value segment in hash values of images, and wherein the target hash table stores at least one linked list, each node in the linked list is used for storing a hash value segment that is at the sequence position of the first hash value segment in a hash value of an image, and hash value segments stored in nodes belonging to the same linked list are the same;

locate a target linked list from the at least one linked list of the target hash table, a second hash value segment stored in each node of the target linked list being the same as the first hash value segment; and retrieve, from candidate images to which the second hash value segment belongs, a target image similar to the reference image.

8. The apparatus according to claim 7, wherein the processor, when executing the computer readable instructions to cause the apparatus to retrieve, from the candidate images to which the second hash value segment belongs, the target image similar to the reference image, is configured to cause the apparatus to:

obtain second hash values of the candidate images to which the second hash value segment belongs, the second hash values being used for representing image features of the candidate images;

calculate hamming distances between the candidate images and the reference image according to the first hash value of the reference image and the second hash values of the candidate images; and retrieve, from the candidate images to which the second hash value segment belongs, the target image whose hamming distance to the reference image is less than a preset threshold.

9. The apparatus according to claim 7, wherein each node of the linked list further stores image information of the image to which the hash value segment in the node belongs; and wherein the processor, after executing the computer readable instructions to cause the apparatus to locate the target linked list from the at least one linked list of the target hash table, is configured to cause the apparatus to:

obtain, according to the image information in each node of the target linked list, a candidate image to which the second hash value segment in each node of the target linked list belongs.

10. The apparatus according to claim 7, wherein the linked list in the target hash table is generate in the following manner:

obtain a hash value of a to-be-processed image in a database;

split the hash value of the image into the preset quantity of hash value segments, wherein a hash value segment of the hash value segments has a unique sequence position corresponding to the position of the hash value segment in the hash value;

locate, for each split hash value segment, a target hash table corresponding to the sequence position of the hash value segment, and detect whether a linked list used for recording the hash value segment exists in the target hash table;

generate, if a linked list used for recording the hash value segment exists in the target hash table, a node recording the hash value segment, and add the generated node to a rear end of the linked list used for recording the hash value segment; and generate, if a linked list used for recording the hash value segment does not exist in the target hash table, a node recording the hash value segment, and set the generated node as the first node of a newly added linked list in the target hash table.

11. The apparatus according to claim 7, wherein the processor, when executing the computer readable instructions to cause the apparatus to locate the target hash table according to the sequence position of the first hash value segment, is configured to cause the apparatus to:

transmit the preset quantity of first hash value segments to a plurality of slave servers, so that each slave server queries, according to a target sequence position of the first hash value segment in the first hash value, the target hash table from an area section in which the slave server is responsible for retrieval, wherein the area section is a partial storage area in storage space of a database;

wherein the processor, when executing the computer readable instructions to cause the apparatus to locate the target linked list from the at least one linked list of the target hash table, is configured to cause the apparatus to:

locate, by using the slave server, the target linked list from the at least one linked list of the target hash table, a second hash value segment stored in the each node of the target linked list being the same as the first hash value segment; and wherein the processor, when executing the computer readable instructions to cause the apparatus to retrieve, from candidate images to which the second hash value segment belongs, the target image similar to the reference image, is configured to cause the apparatus to:

receive a query result returned by the slave server, the query result comprising at least: information of the target image that is similar to the reference image, wherein the target image is retrieved from the candidate images to which the second hash value segment belongs.

12. The apparatus according to claim 11, wherein the processor, when executing the computer readable instructions, is further configured to cause the apparatus to:

determine, when a faulty slave server is detected in the plurality of slave servers, an area section in which the faulty slave server is currently responsible for retrieval; and allocate the area section corresponding to the faulty slave server to at least one slave server in a normal running state.

13. A non-transitory storage medium for storing computer readable instructions, the computer readable instructions, when executed by a processor, causing the processor to:

obtain a first hash value of a to-be-retrieved reference image, the first hash value being used for representing an image feature of the reference image;

split the first hash value into a preset quantity of first hash value segments, wherein a first hash value segment of the first hash value segments has a unique sequence position corresponding to a position of the first hash value segment in the first hash value;

locate a target hash table according to the sequence position of the first hash value segment, wherein the target hash table is used for storing hash value segments that are at the sequence position of the first hash value segment in hash values of images, and wherein the target hash table stores at least one linked list, each node in the linked list is used for storing a hash value segment that is at the sequence position of the first hash value segment in a hash value of an image, and hash value segments stored in nodes belonging to the same linked list are the same;

locate a target linked list from the at least one linked list of the target hash table, a second hash value segment stored in each node of the target linked list being the same as the first hash value segment; and retrieve, from candidate images to which the second hash value segment belongs, a target image similar to the reference image.

14. The non-transitory storage medium according to claim 13, wherein, when the computer readable instructions cause the processor to retrieve, from the candidate images to which the second hash value segment belongs, the target image similar to the reference image, the computer readable instructions cause the processor to:

obtain second hash values of the candidate images to which the second hash value segment belongs, the second hash values being used for representing image features of the candidate images;

calculate hamming distances between the candidate images and the reference image according to the first hash value of the reference image and the second hash values of the candidate images; and retrieve, from the candidate images to which the second hash value segment belongs, the target image whose hamming distance to the reference image is less than a preset threshold.

15. The non-transitory storage medium according to claim 13, wherein each node of the linked list further stores image information of the image to which the hash value segment in the node belongs; and wherein, when the computer readable instructions cause the processor to locate the target linked list from the at least one linked list of the target hash table, the computer readable instructions cause the processor to:

obtain, according to the image information in each node of the target linked list, a candidate image to which the second hash value segment in each node of the target linked list belongs.

16. The non-transitory storage medium according to claim 13, wherein the linked list in the target hash table is generate in the following manner:

obtain a hash value of a to-be-processed image in a database;

split the hash value of the image into the preset quantity of hash value segments, wherein a hash value segment of the hash value segments has a unique sequence position corresponding to the position of the hash value segment in the hash value;

locate, for each split hash value segment, a target hash table corresponding to the sequence position of the hash value segment, and detect whether a linked list used for recording the hash value segment exists in the target hash table;

generate, if a linked list used for recording the hash value segment exists in the target hash table, a node recording the hash value segment, and add the generated node to a rear end of the linked list used for recording the hash value segment; and generate, if a linked list used for recording the hash value segment does not exist in the target hash table, a node recording the hash value segment, and set the generated node as the first node of a newly added linked list in the target hash table.

17. The non-transitory storage medium according to claim 13, wherein, when the computer readable instructions cause the processor to locate the target hash table according to the sequence position of the first hash value segment, the computer readable instructions cause the processor to:

transmit the preset quantity of first hash value segments to a plurality of slave servers, so that each slave server queries, according to a target sequence position of the first hash value segment in the first hash value, the target hash table from an area section in which the slave server is responsible for retrieval, wherein the area section is a partial storage area in storage space of a database;

wherein, when the computer readable instructions cause the processor to locate the target linked list from the at least one linked list of the target hash table, the computer readable instructions cause the processor to:

locate, by using the slave server, the target linked list from the at least one linked list of the target hash table, a second hash value segment stored in the each node of the target linked list being the same as the first hash value segment; and wherein, when the computer readable instructions cause the processor to retrieve, from candidate images to which the second hash value segment belongs, a target image similar to the reference image, the computer readable instructions cause the processor to:

receive a query result returned by the slave server, the query result comprising at least: information of the target image that is similar to the reference image, wherein the target image is retrieved from the candidate images to which the second hash value segment belongs.

18. The non-transitory storage medium according to claim 17, wherein, the computer readable instructions further cause the processor to:

determine, when a faulty slave server is detected in the plurality of slave servers, an area section in which the faulty slave server is currently responsible for retrieval; and allocate the area section corresponding to the faulty slave server to at least one slave server in a normal running state.

* * * * *